United States Patent
Onodera et al.

(10) Patent No.: US 8,000,963 B2
(45) Date of Patent: Aug. 16, 2011

(54) SOUND REPRODUCING APPARATUS

(75) Inventors: Sachiko Onodera, Kawasaki (JP); Ryo Ochitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 957 days.

(21) Appl. No.: 11/089,179

(22) Filed: Mar. 25, 2005

(65) Prior Publication Data

US 2006/0136247 A1 Jun. 22, 2006

(30) Foreign Application Priority Data

Dec. 17, 2004 (JP) .................. 2004-366731

(51) Int. Cl.
G10L 17/00 (2006.01)

(52) U.S. Cl. ...................................... 704/249
(58) Field of Classification Search .................. 704/249
See application file for complete search history.

(56) References Cited

U.S. PATENT DOCUMENTS

| 2002/0086716 | A1* | 7/2002 | Pan | 455/569 |
| 2004/0068406 | A1* | 4/2004 | Maekawa et al. | 704/235 |
| 2005/0183121 | A1* | 8/2005 | Kim et al. | 725/46 |
| 2006/0090137 | A1* | 4/2006 | Cheng et al. | 715/758 |

FOREIGN PATENT DOCUMENTS

| JP | 1992-158400 A | 6/1992 |
| JP | 1995-049695 A | 2/1995 |
| JP | 1998-069482 A | 3/1998 |
| JP | 10-173769 | 6/1998 |
| JP | 2000-231561 A | 8/2000 |
| JP | 2002-169803 A | 6/2002 |
| JP | 2004-266578 A | 9/2004 |

OTHER PUBLICATIONS

"Japanese Office Action", Issued in connection with related JP application No. 2004-366731 (Partial Translation).
Nishimura, Mitsuru et al.,"An Implementation of Video Conference Recording System with Playing Back Time Control", *IEICE Technical Report*, vol. 102, No. 667 Feb. 24, 2003, 27-32 (English language abstract provided).

* cited by examiner

*Primary Examiner* — Jakieda Jackson
(74) *Attorney, Agent, or Firm* — Fujitsu Patent Center

(57) ABSTRACT

The sound reproducing apparatus includes a replay section receiving unit that receives a request for reproducing a specific part of sound file from a user, a replay section determining unit that determines a replay section based on the request and conversation structure information stored in a sound data holding unit, and a reproducing unit that reproduces the replay section determined by the replay section determining unit.

11 Claims, 13 Drawing Sheets

FIG.5

VOICE CONVERSATION TABLE 300

| CATEGORY | IDENTIFICATION (ID) | YEAR | MONTH | DAY | START TIME | END TIME | OPERATOR NAME | GROUP NAME | SPEAKER | PHASE NAME | DISCOURSE TAG NAME | AVERAGE PITCH | AVERAGE POWER | VOICE FILE | POSITION | ... |
|---|---|---|---|---|---|---|---|---|---|---|---|---|---|---|---|---|
| CONVERSATION | 1-2F05 | 2004 | 7 | 1 | 10:02:25:150 | 10:20:04:500 | F05 | G-1 | - | - | - | 180 | -28 | 12A.wav | 0:00:000-17:39:350 | ... |
| ... | | | | | | | | | | | | | | | | |
| PHASE | 1-2F05_p1 | 2004 | 7 | 1 | 10:02:25:150 | 10:04:15:350 | F05 | G-1 | - | START GREETING | - | 192 | -26 | 12A_1.wav | 0:00:000-2:10:150 | ... |
| PHASE | 1-2F05_p2 | 2004 | 7 | 1 | 10:04:25:350 | 10:10:11:250 | F05 | G-1 | - | CUSTOMER INFORMATION COLLECTION | - | 176 | -25 | 12A_2.wav | 0:00:000-5:3:350 | ... |
| PHASE | 1-2F05_p_3 | 2004 | 7 | 1 | ... | ... | F05 | G-1 | - | SERVICE EXPLANATION | - | 166 | -31 | 12A_3.wav | 0:00:000-4:10:350 | ... |
| ... | | | | | | | | | | | | | | | | |
| UTTERANCE | 1-2F05_u1 | 2004 | 7 | 1 | 10:02:25:150 | 10:02:40:210 | F05 | G-1 | A | - | GREETING | 182 | -26 | 12A_1.wav | 0:00:000-0:30:250 | ... |
| UTTERANCE | 1-2F05_u2 | 2004 | 7 | 1 | ... | ... | F05 | G-1 | C | - | GREETING | 150 | -29 | 12A_1.wav | 0:00:000-0:30:250 | ... |
| ... | | | | | | | | | | | | | | | | |

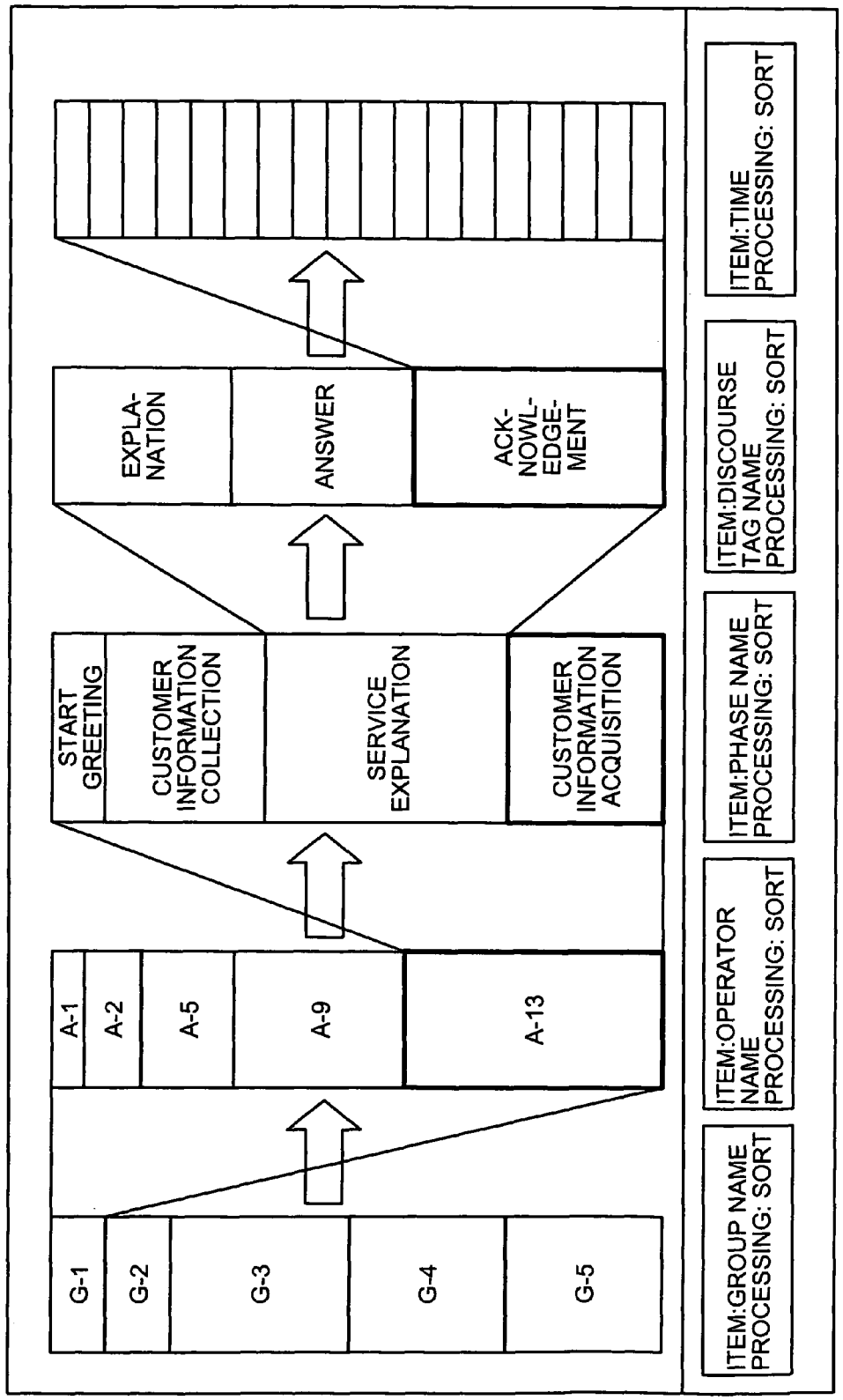

SOUND REPRODUCING APPARATUS

BACKGROUND OF THE INVENTION

1) Field of the Invention

The present invention relates to a sound reproducing apparatus that reproduces an appropriate part of a recorded conversation based on a request from a user.

2) Description of the Related Art

In an analysis of a large quantity of voice data recorded in a call center, in a meeting, and the like, it is difficult to listen to all the voice data. Thus, there is a demand that a user listen to only a specific part of the recorded voice data. In response to such a demand, there are methods of searching only parts including a specific keyword or having a large sound volume.

The above conventional art can reproduce the voice data from the specific part to which the user wishes to listen, instead of reproducing it from the top. In many cases, however, the user needs to reproduce and listen to the voice data from an earlier part than the specific part to know the context. Therefore, for example, Japanese Patent Laid-Open No. H10-173769 discloses a technique for reproducing voice from a part earlier than a part designated by a user, by time decided suitably.

However, simply by reproducing voice data from an earlier part by fixed time, a replay section is not always enough to understand the context. If the replay section is not appropriate, significant time and labor are required in a process of finding out an appropriate replay section manually.

SUMMARY OF THE INVENTION

It is an object of the present invention to at least solve the problems in the conventional technology.

A computer-readable recording medium according to an aspect of the present invention stores a computer program for reproducing a specific part of recorded sound. The computer-readable recording medium causes a computer to execute: receiving a request for reproducing a first part of the recorded sound from a user; determining, based on the request and a structure of the recorded sound, a second part of the recorded sound that includes the first part; and reproducing the second part.

A sound reproducing apparatus according to another aspect of the present invention reproduces a specific part of recorded sound, and includes: a receiving unit that receives a request for reproducing a first part of the recorded sound from a user; a determining unit that determines, based on the request and a structure of the recorded sound, a second part of the recorded sound that includes the first part; and a reproducing unit that reproduces the second part.

A method according to still another aspect of the present invention is a method for reproducing a specific part of recorded sound, and includes: receiving a request for reproducing a first part of the recorded sound from a user; determining, based on the request and a structure of the recorded sound, a second part of the recorded sound that includes the first part; and reproducing the second part.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is an example of a voice conversation data table held by the sound data holding unit;

FIG. 6 is a diagram for explaining how to specify a replay section;

DETAILED DESCRIPTION

Exemplary embodiments of the present invention are explained in detail below with reference to the accompanying drawings. In the following explanation, an analysis of calls recorded in a call center is mainly explained.

Figure 1:
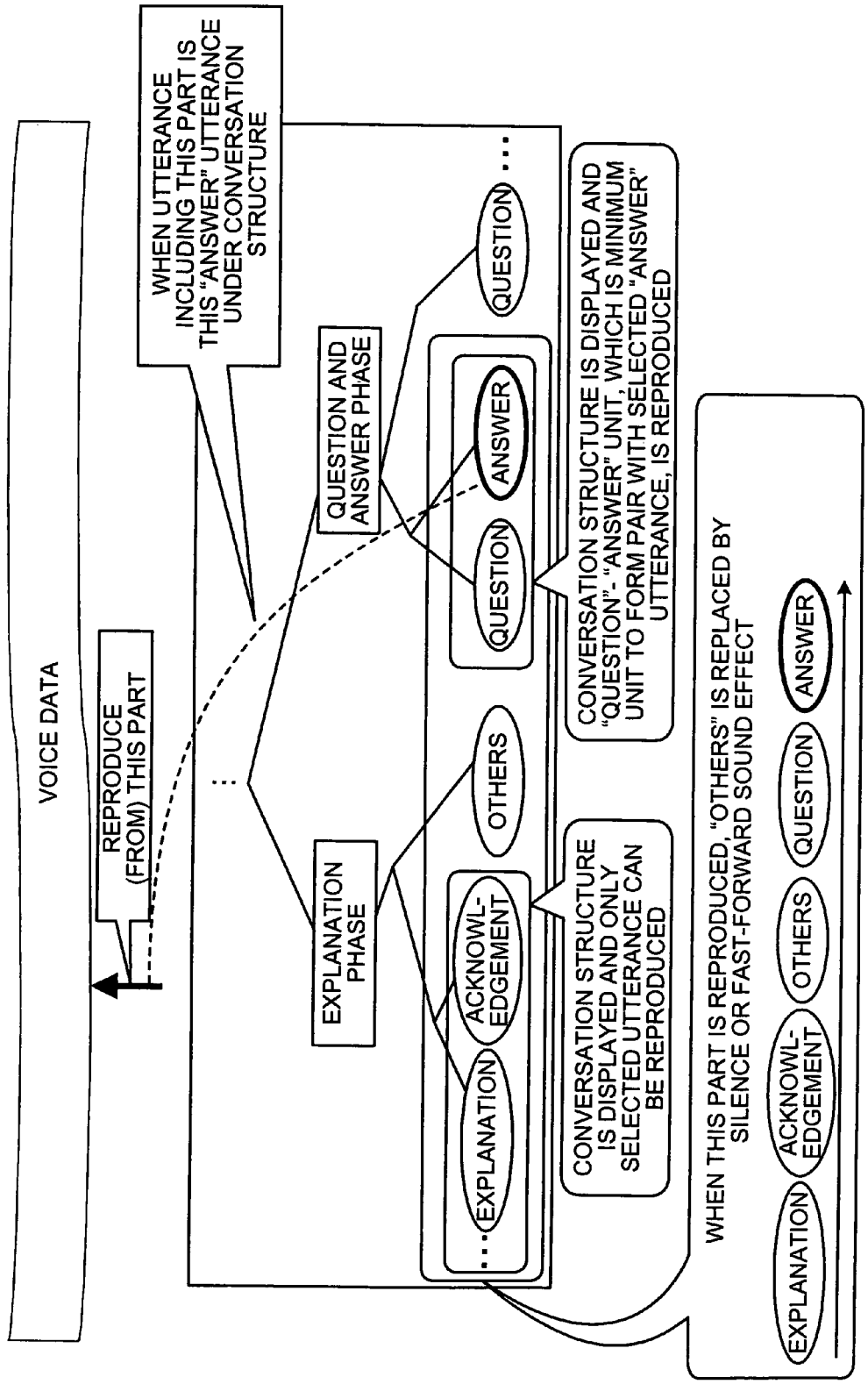
FIG. 1 is a diagram for explaining a method of determining a section to be reproduced in voice data by a sound reproducing apparatus according to an embodiment of the present invention.

FIG. 1 is a diagram for explaining a method of determining a section to be reproduced in voice data (hereinafter, "replay section") by the sound reproducing apparatus according to an embodiment of the present invention. The sound reproducing apparatus determines a replay section based on a conversation structure of a call.

In FIG. 1, parts of a conversation structure are represented by a tree structure. An "explanation" phase is a part of explanation by an operator. A "question and answer" phase is a part of question and answer by a customer and the operator following the "explanation" phase. The "explanation" phase includes utterances like "explanation", "acknowledgement", and "others". The "question and answer" phase includes utterances like "question", "answer", and "question".

Figure 2:
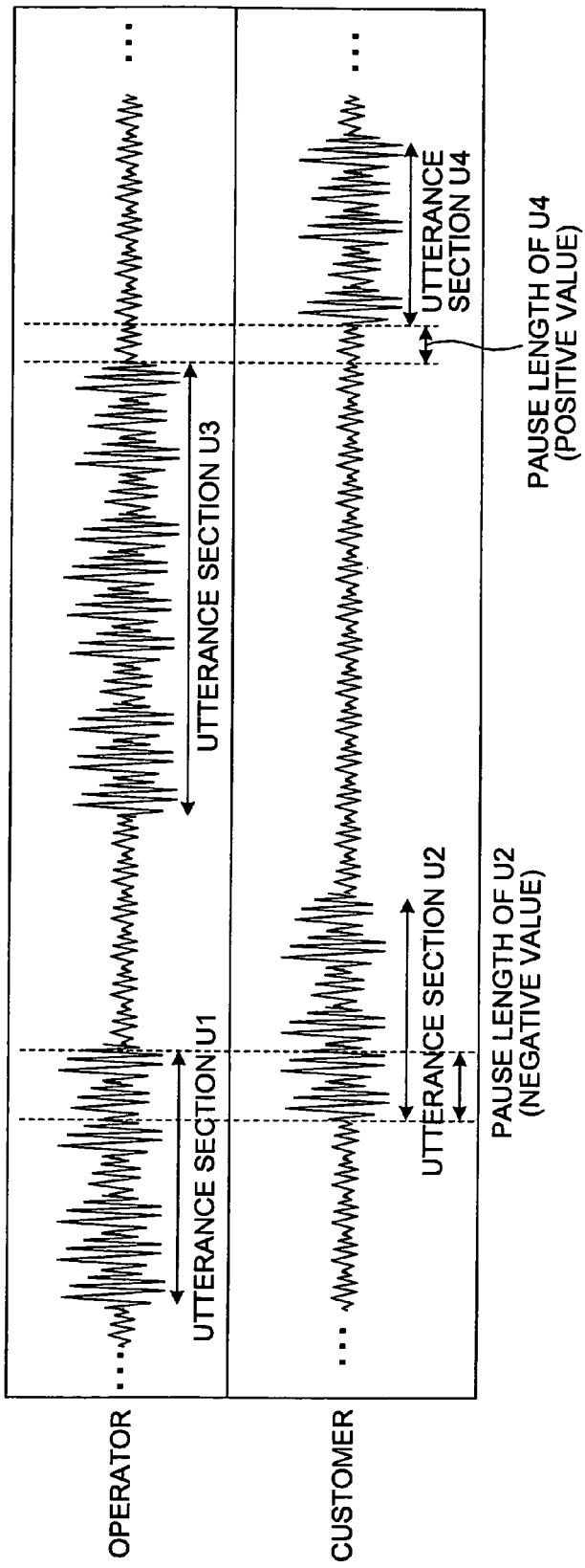
FIG. 2 is a diagram of utterance sections.

The utterance means a part of continuous remarks by an operator or a customer. FIG. 2 is a diagram of utterance sections. The figure shows a conversation between the operator and the customer. In the conversation, first, there is an utterance section of the operator and there is an utterance section of the customer partially overlapping the utterance section of the operator. Thereafter, after a short time when there are no remarks of both the operator and the customer, there are an utterance section of the operator, and an utterance section of the customer.

In FIG. 1, when a point included in the "answer" part of the "question and answer" phase is designated, by keyword search or the like, as a start point of reproduction, the sound reproducing apparatus displays the conversation structure and determines a "question"-"answer" unit, which is a minimum conversation unit including the "answer" part in the conversation structure, as a replay section. In other words, the sound reproducing apparatus selects a meaningful section as a replay section based on the conversation structure. Consequently, the sound reproducing apparatus can reproduce only a part of voice data enough to understand the context of a call.

The sound reproducing apparatus is also capable of displaying the conversation structure to cause a user to select an utterance and determining a minimum conversation unit including the utterance selected by the user as a replay section. For example, when the sound reproducing apparatus displays the conversation structure shown in FIG. 1 and the user selects "answer" part, the sound reproducing apparatus determines the "question"-"answer" unit as a replay section.

The sound reproducing apparatus extends the determined replay section when the user designates extension of the replay section, by selecting a node adjacent to a node corresponding to the present replay section or a higher order node based on the conversation structure. For example, when the present replay section is "question"-"answer" unit and the user designates extension of the replay section, the "question and answer" phase, which is a higher order node in the conversation structure, becomes the extended replay section.

Thus, the sound reproducing apparatus can appropriately extend a section which the user listens to, by extending the replay section stepwise based on the conversation structure.

When there is a discontinuous part in a replay section selected by the user and reproduced in time series, the sound reproducing apparatus reduces duration time of the discontinuous part and replaces the discontinuous part by silence. The discontinuous part means a part that actually includes voice but is not designated as the replay section.

For example, in FIG. 1, if the user selects "explanation", "acknowledgement", "question", and "answer" as a replay section, "others" is not included in the replay section. Thus, "others" is a discontinuous part. In this case, the sound reproducing apparatus reproduces the utterances in the replay section in time series and, when "others" comes, reduces the duration time of "others" to 1/10 and replaces it by silence.

Therefore, the user can listen to an unselected part in a fast-forward manner and recognize that some voice is not reproduced.

It is also possible to insert sound effect, instead of silence, corresponding to a type of each utterance. Further, it is also possible to change a ratio of the reduction to a ratio other than 1/10, or insert silence or sound effect in the discontinuous part without reducing the duration time of it.

Figure 3:
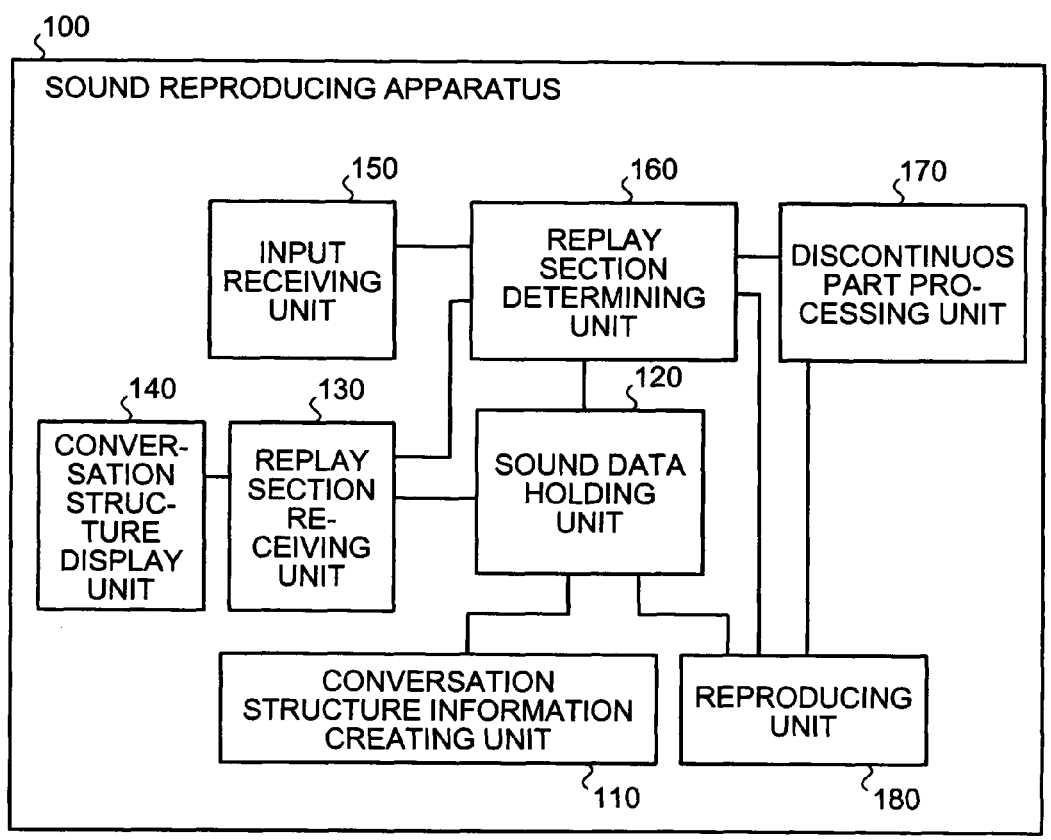
FIG. 3 is a functional block diagram of a structure of the sound reproducing apparatus.

FIG. 3 is a functional block diagram showing the structure of the sound reproducing apparatus. A sound reproducing apparatus 100 includes a conversation structure information creating unit 110, a sound data holding unit 120, a replay section receiving unit 130, a conversation structure display unit 140, an input receiving unit 150, a replay section determining unit 160, a discontinuous part processing unit 170, and a reproducing unit 180.

The conversation structure information creating unit 110 is a processing unit that analyzes voice conversation data to create conversation structure information and stores the conversation structure information as well as the voice conversation data and a result of the analysis thereof in the sound data holding unit 120. Details of conversation structure information creating processing by the conversation structure information creating unit 110 are described later.

Figure 4:
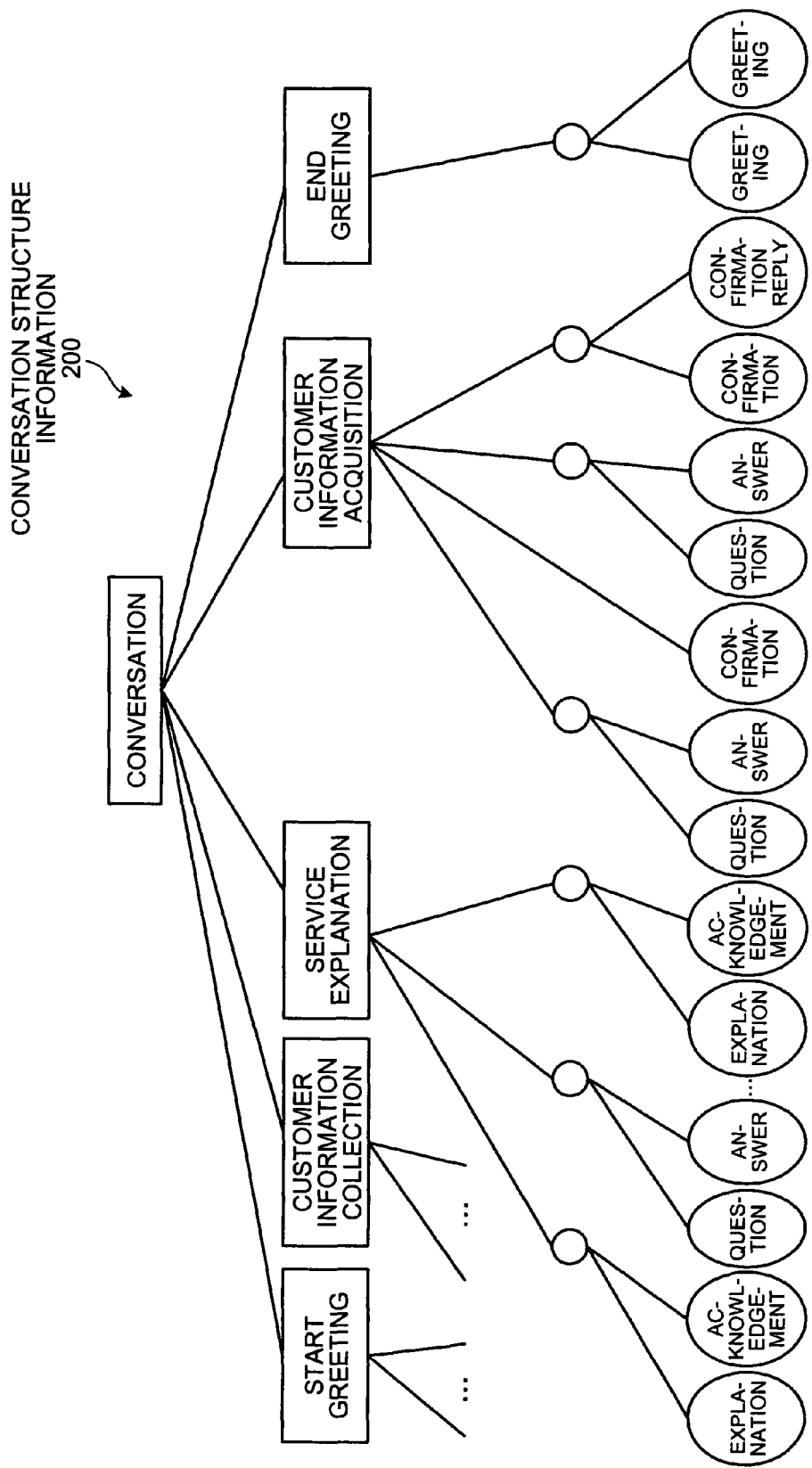
FIG. 4 is a diagram of an example of conversation structure information held by a sound data holding unit shown in FIG. 3.

The sound data holding unit 120 is a storing unit that holds the conversation structure information created by the conversation structure information creating unit 110 as well as the voice conversation data and the result of the analysis thereof as a voice conversation data table. FIG. 4 is a diagram of an example of the conversation structure information held by the sound data holding unit 120. FIG. 5 is an example of the voice conversation data table held by the sound data holding unit 120.

As shown in FIG. 4, the sound data holding unit 120 holds conversation structure information 200 in a tree structure. In FIG. 4, "conversation" is an entire call between a customer and an operator, and includes phases of "start greeting", "customer information collection", "service explanation", "customer information acquisition", and "end greeting". The "service explanation" phase includes utterances of "explanation" and "acknowledgement".

The "explanation" and the "acknowledgement", which are end nodes in the tree structure, are utterances. The encircled "explanation", the "acknowledgement", and the like are indicators indicating (hereinafter, "discourse tag") contents of utterances. The utterance attached with the discourse tag is referred to as "discourse".

A layer of discourse pair is provided between a layer of phase and a layer of discourse. A discourse pair is included in a phase, and formed by continuous utterances by different speakers and having a combination of discourse tags as described below.

"Question"-"Answer"
"Explanation"-"Acknowledgement"
"Confirmation"-"Confirmation reply"
"Greeting"-"Greeting"

The conversation structure information 200 corresponds to voice conversation data in a one to one relation. Each node in the tree structure is assigned identification IDs like "conversation", "phase", and "utterance" as node IDs. In FIG. 4, all the discourse pairs are formed by nodes adjacent to each other on a time axis. However, the discourse pair does not need to be formed by nodes adjacent to each other.

As shown in FIG. 5, the sound data holding unit 120 holds information such as "conversation" and "phase" and "utterance", which are a result of an analysis of the "conversation", in a voice conversation data table 300.

The voice conversation data table 300 holds information like category, identification (ID), year, month, day, start time, end time, operator name, group name, speaker, phase name, discourse tag name, average pitch, average power, voice file, and position, for plural voice conversation data.

The category indicates which of "conversation", "phase", and "utterance" the voice conversation data falls into. The ID is an identifier for identifying the respective voice conversation data. The year, month, and day indicates year, month, and day of a call, the start time indicates time when the call is started, and the end time indicates time when the call ends.

The operator name indicates a name of an operator who talks to a customer. The group name indicates a name of a group to which the operator belongs. The speaker indicates an operator (=agent, "A") or a customer ("C"). The phase name indicates a name of a phase when voice conversation data falls into "phase". The discourse tag name indicates a discourse tag of an utterance when voice conversation data falls into "utterance".

The average pitch indicates an average value of pitches among respective sections. The average power indicates an average value of powers of the respective sections. The voice file indicates a name of a file in which voice conversation data is stored. The position indicates a start time and an end time of the voice conversation data in the voice file.

Referring back to FIG. 3, the replay section receiving unit 130 is a processing unit that receives a replay section designated by a user. The replay section receiving unit 130 passes the received replay section to the conversation structure display unit 140 and the replay section determining unit 160.

FIG. 6 is a diagram for explaining replay section receiving processing by the replay section receiving unit 130.

The figure shows a procedure in which the replay section receiving unit 130 specifies a replay section while interacting with a user. First, the replay section receiving unit 130 displays groups names in order from one having a smallest amount of voice conversation data and causes the user to select a group to which a target operator belongs.

When the user selects a group name, the replay section receiving unit 130 displays operator names in order from one having a smallest amount of voice conversation data. In FIG. 6, the user selects a group with a group name "G-1", and names "A-1", "A-2", and the like of operators belonging to the group are displayed.

When the user selects an operator name, the replay section receiving unit 130 displays voice conversation data of the operator for each phase. In FIG. 6, the user selects a name "A-13" of the operator, and voice conversation data of the operator is displayed for each phase.

When the user selects a phase name, the replay section receiving unit 130 displays voice conversation data of the phase for each discourse. In FIG. 6, the user selects a phase "service explanation", and voice conversation data of the phase is displayed for each discourse.

When the user selects a discourse tag name, the replay section receiving unit 130 displays voice conversation data of the discourse tag in an order of time. In FIG. 6, the user selects a discourse "acknowledgement", and voice conversation data of the discourse is displayed in an order of time. Then, when the user selects a specific "acknowledgement", the replay section receiving unit 130 receives the "acknowledgement" as a replay section and passes the "acknowledgement" to the conversation structure display unit 140 and the replay section determining unit 160. Note that, in this explanation, the replay section receiving unit 130 causes the user to select the discourse. However, it is also possible to cause the user to select nodes of other layers in the conversation structure information 200.

The conversation structure display unit 140 is a processing unit that receives the replay section from the replay section receiving unit 130 and displays a conversation structure of voice conversation data including the replay section with reference to the sound data holding unit 120.

Figure 7:
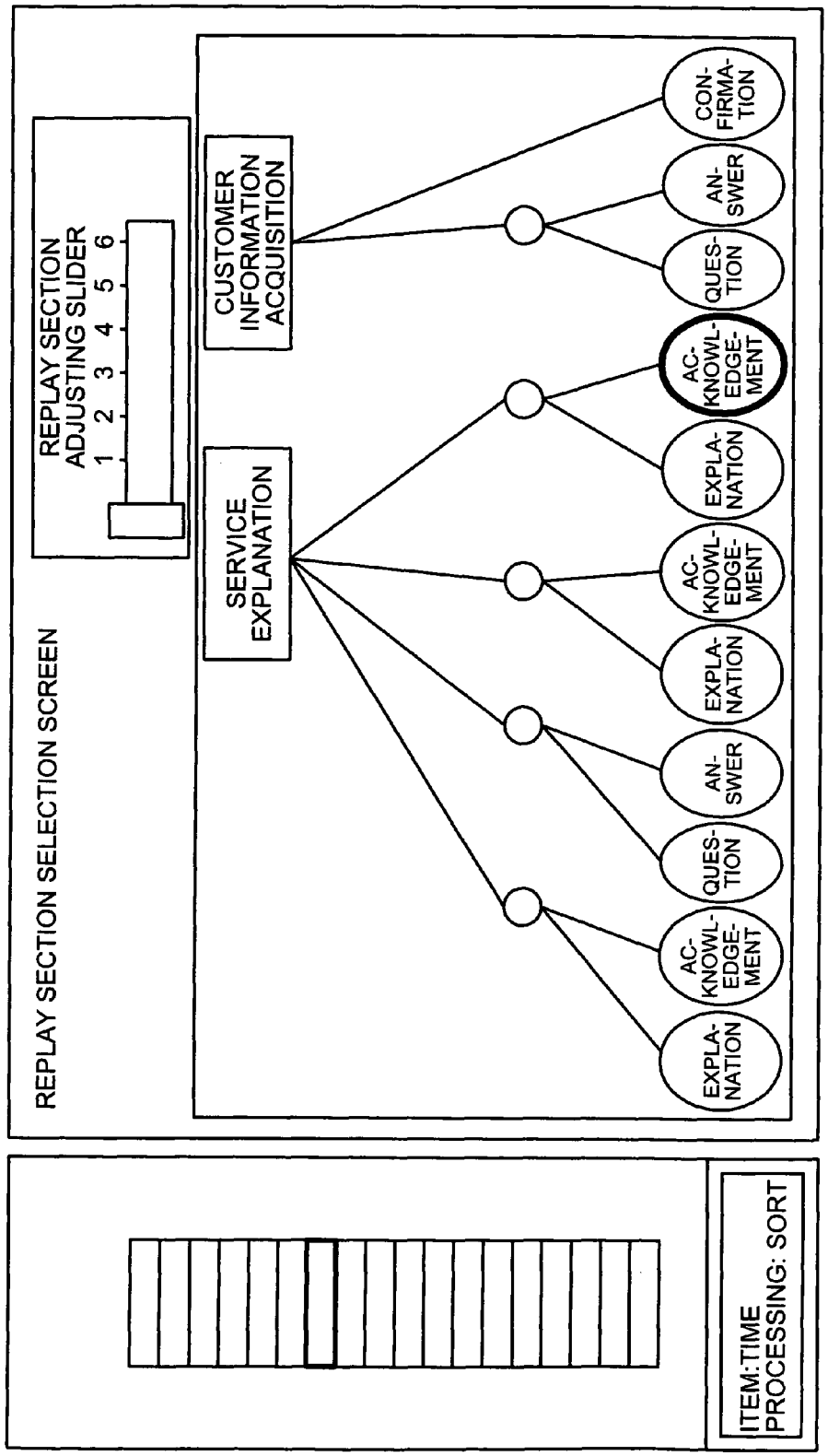
FIG. 7 is a diagram of an example of a conversation structure displayed by a conversation structure display unit shown in FIG. 3.

FIG. 7 is a diagram of an example of a conversation structure displayed by the conversation structure display unit 140. As shown in the figure, the conversation structure display unit 140 displays a conversation structure including the "acknowledgement" designated as the replay section. The user can also designate a replay section from this conversation structure display screen. In other words, this conversation structure display screen is used as a voice replay section selection screen.

A replay section adjusting slider on the conversation structure display screen is a slider for extending the replay section. The user can designate extension of plural levels at a time by moving the replay section adjusting slider on plural scales.

The input receiving unit 150 is a processing unit that receives the replay section, which is designated by the user by selecting a node in the conversation structure displayed by the conversation structure display unit 140, and passes the replay section to the replay section determining unit 160. This input receiving unit 150 receives the number of scales on the replay section adjusting slider when it is moved by the user, and passes the number of scales to the replay section determining unit 160.

The replay section determining unit 160 is a processing unit that receives the replay section from the replay section receiving unit 130 and determines a replay section based on the conversation structure information 200 stored in the sound data holding unit 120. The replay section determining unit 160 passes the determined replay section to the reproducing unit 180.

Specifically, this replay section determining unit 160 specifies a discourse pair including the discourse received from the replay section receiving unit 130 and determines the specified discourse pair as a replay section.

Since the replay section determining unit 160 determines the replay section based on the conversation structure information 200 stored in the sound data holding unit 120, it is possible to reproduce an appropriate section of voice conversation data.

In addition, the replay section determining unit 160 receives information on the replay section, which is designated by the user using the conversation structure display screen, from the input receiving unit 150 and judges whether there is a discontinuous part with reference to the sound data holding unit 120. When there is no discontinuous part, the replay section determining unit 160 passes the information on the replay section to the reproducing unit 180. When there is a discontinuous part, the replay section determining unit 160 passes the information on the replay section to the discontinuous part processing unit 170 together with information on the discontinuous part.

Further, the replay section determining unit 160 receives the number of scales on which the replay section adjusting slider is moved, extends the replay section, and passes information on the replay section to the reproducing unit 180.

Specifically, the replay section determining unit 160 extends the replay section to meet the conversation structure information 200 according to rules decided in advance. As the rules decided in advance, there are the following rules.

A: Set a current position on a selected discourse in a tree structure

B: Add a node adjacent to the node of the current position, which is a brother node thereof, to the replay section C: Add all nodes below a parent node of the node of the current position, and set the current position to the parent node The replay section determining unit 160 applies these rules repeatedly in an order of A, B, C, B, C, and so on to extend the replay section.

The replay section determining unit 160 can also extend the replay section as long as the duration time of replay section does not exceed a predetermined value explicitly inputted by the user. In addition, the replay section determining unit 160 can also store tendency of selection of the replay section adjusting slider and nodes by the user (how many nodes are added to the replay section) and learn the tendency to automatically determine a section to be extended.

The discontinuous part processing unit 170 is a processing unit that replaces a discontinuous part (that is, an unselected discourse) by silence whose duration time is proportional to that of the unselected part (e.g., the duration time of the unselected discourse×0.1). The discontinuous part processing unit 170 passes information on the replay section including a result of the processing to the reproducing unit 180. However, when the proportional time exceeds threshold time decided in advance, the inserting time is limited to the threshold time to prevent silence time from becoming too long.

Since the discontinuous part processing unit 170 inserts silence corresponding to the duration time of the discontinuous part, the user can recognize that there is an unreproduced utterance even when only a necessary part of voice data is reproduced.

It is also possible to set sound effect corresponding to a discourse tag and insert the sound effect (a beep sound with a pitch thereof changed) instead of inserting silence. Since sound effect corresponding to a discourse tag is inserted, the user can roughly understand what kind of voice is actually present in the discontinuous part simply by reproducing the voice.

The reproducing unit 180 is a processing unit that receives the information on the replay section from the replay section determining unit 160 or the discontinuous part processing unit 170 and reproduces the voice with reference to the sound data holding unit 120.

Figure 8:
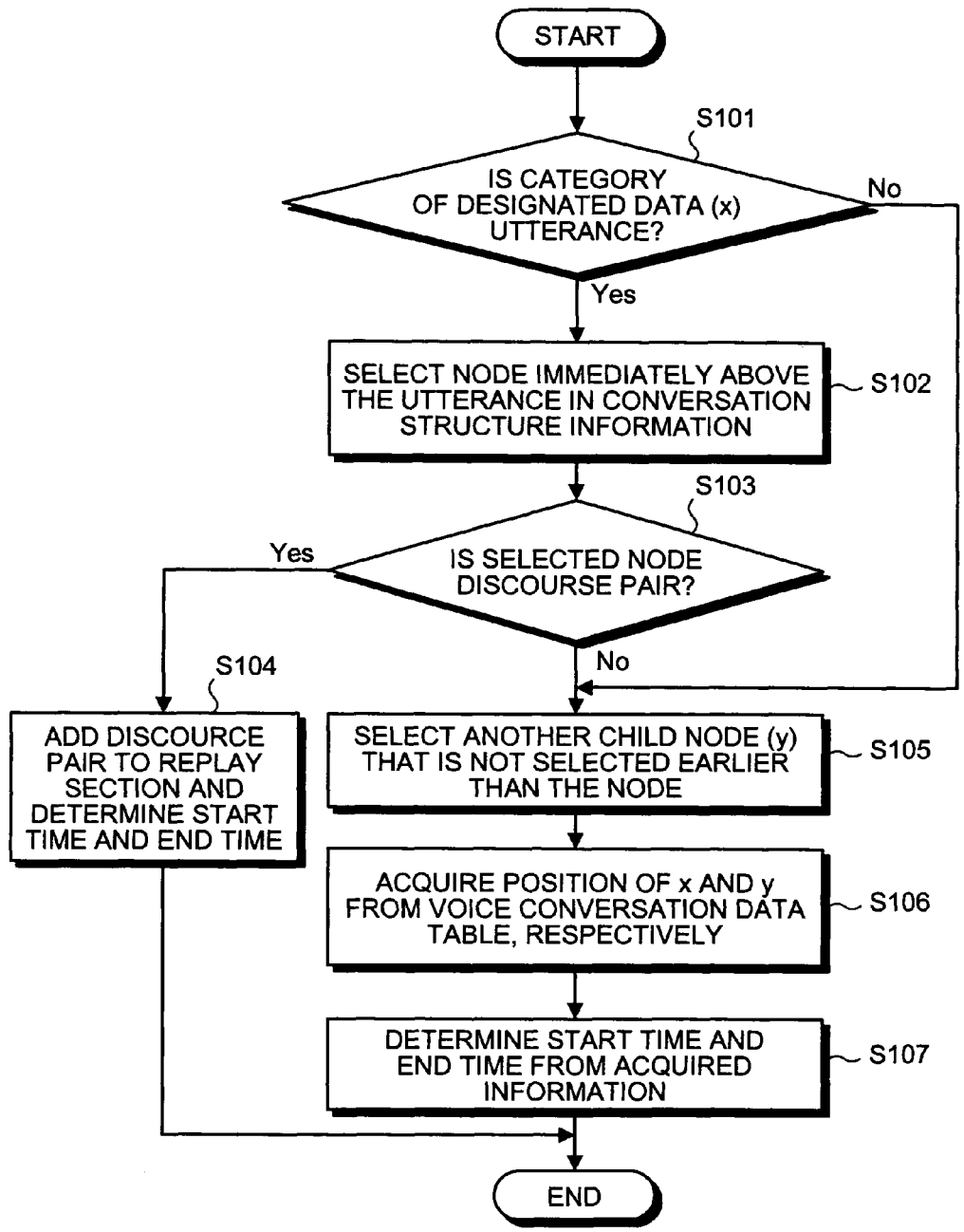
FIG. 8 is a flowchart of a procedure for replay section determination processing by a replay section determining unit shown in FIG. 3.

FIG. 8 is a flowchart of the replay section determination processing by the replay section determining unit 160 that receives the replay section from the replay section receiving unit 130.

The replay section determining unit 160 judges whether category of voice conversation data (x) designated by the user is a discourse (step S101). If the category is a discourse, the replay section determining unit 160 acquires a node immediately above the discourse in the tree structure of the conversation structure information 200 (step S102).

Then, the replay section determining unit 160 judges whether the acquired node is a discourse pair (step S103). If the node is a discourse pair, the replay section determining unit 160 determines the discourse pair as a replay section (step S104), acquires the start time and end time thereof, and ends the processing.

On the other hand, if the acquired node is not a discourse pair, the replay section determining unit 160 acquires a child node (y) that is not selected and earlier in time series than the node acquired (step S105) and acquires the position of x and y in voice conversation data from the voice conversation data table 300, respectively (step S106). Then, the replay section determining unit 160 determines the start time and end time of the replay section from the acquired information (step S107) and ends the processing.

If category of the designated voice conversation data (x) is not a discourse ("No" in step S101), the replay section determining unit 160 acquires the child node (y) that is not selected and earlier in time series than the node designated (step S105), and acquires the position of x and y in voice conversation data from the voice conversation data table 300, respectively (step S106). Then, the replay section determining unit 160 determines the start time and end time of the replay section from the acquired information (step S107) and ends the processing.

Thus, the replay section determining unit 160 determines a replay section from data designated by the user using the conversation structure information 200. Consequently, the sound reproducing apparatus 100 can reproduce an appropriate replay section in voice conversation data.

Figure 9:
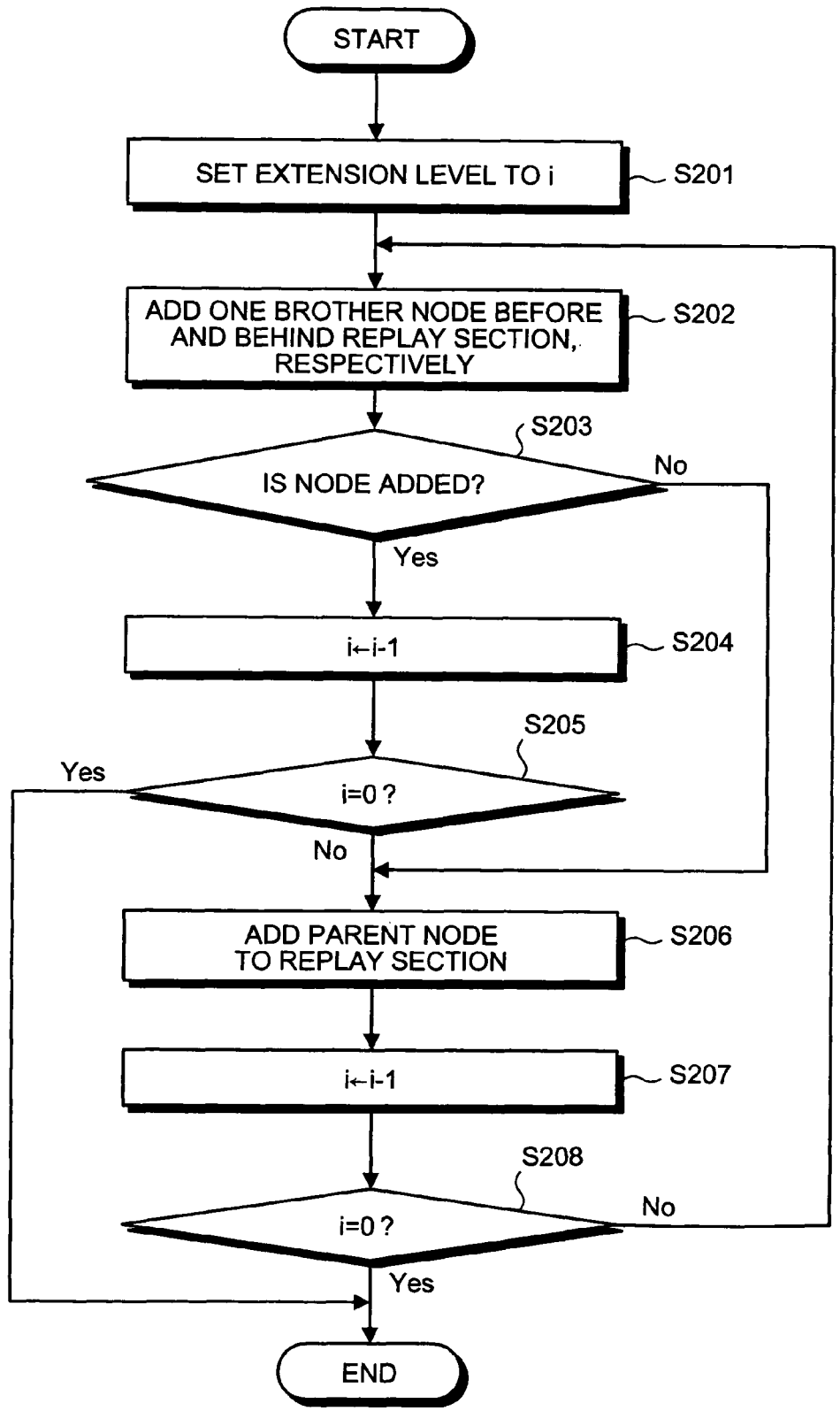
FIG. 9 is a flowchart of a procedure for replay section extension processing by the replay section determining unit.

FIG. 9 is a flowchart of the replay section extension processing by the replay section determining unit 160. In the replay section extension processing to be explained here, the user designates extension of a replay section using the replay section adjusting slider.

The replay section determining unit 160 sets a replay section extension level acquired through the input receiving unit 150 to i (step S201) and adds one brother node of the present replay section before and behind the replay section, respectively (step S202).

Then, the replay section determining unit 160 judges whether the brother node is present and is successfully added before or behind the replay section (step S203). If no brother node is present and is successfully added before and behind the replay section, the replay section determining unit 160 proceeds to step S206. If the brother node is successfully added, the replay section determining unit 160 deducts "1" from i (step S204) and judges whether i is equal to 0 (step S205).

If i is equal to 0, the replay section determining unit 160 ends the extension processing. If i is not equal to 0, the replay section determining unit 160 sets a parent node as the replay section (step S206) and deducts "1" from i (step S207). Then, the replay section determining unit 160 judges whether i is equal to 0 (step S208). If i is equal to 0, the replay section determining unit 160 ends the extension processing. If i is not equal to 0, the replay section determining unit 160 returns to step S202 and continues the extension processing.

Thus, the replay section determining unit 160 repeatedly performs the addition of the brother node to the node(s) corresponding to the present replay section and the shift to the parent node alternately to thereby extend the replay section automatically.

Figure 10:
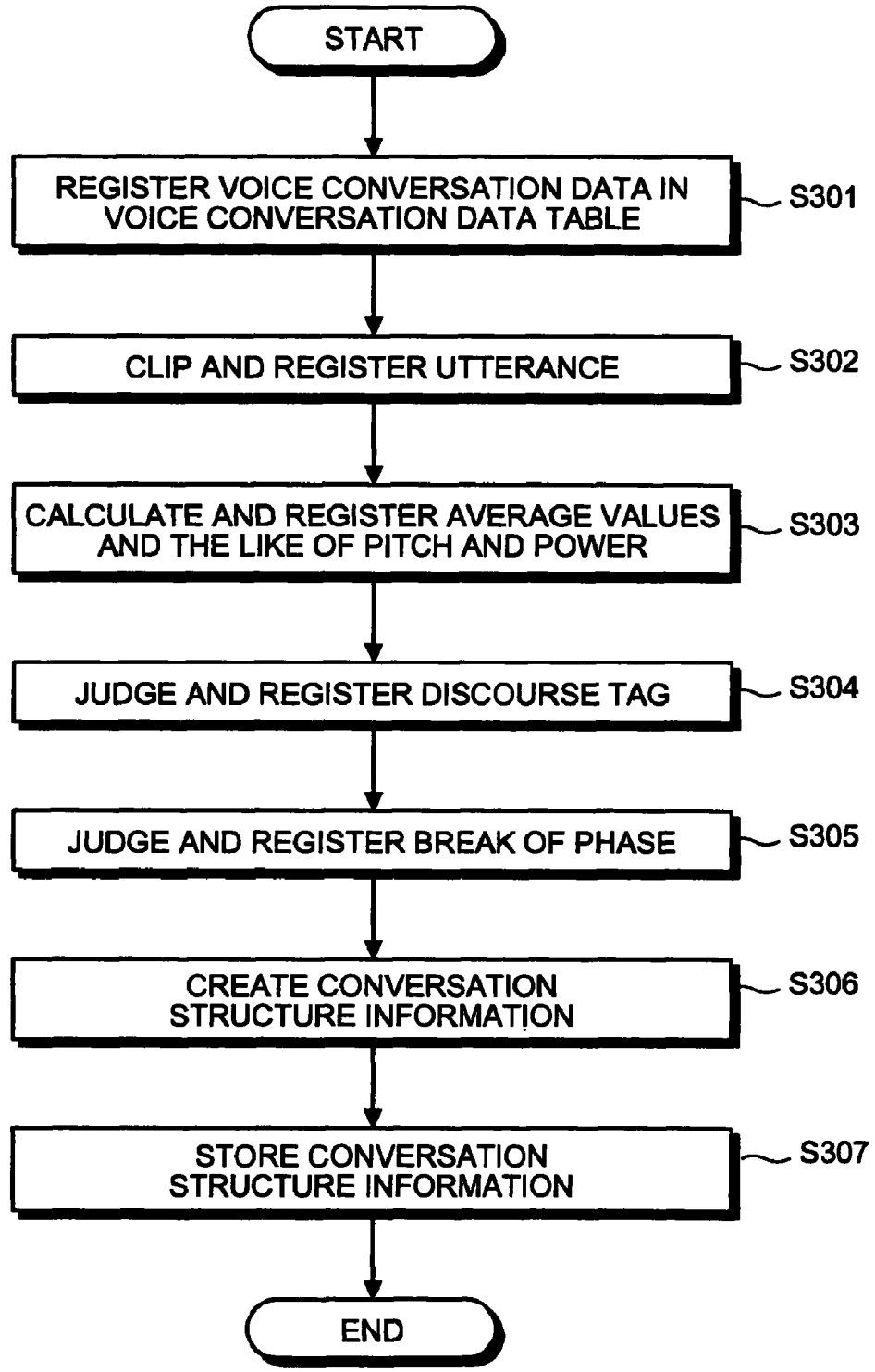
FIG. 10 is a flowchart of a procedure for processing by a conversation structure information creating unit shown in FIG. 3.

Next, details of processing by the conversation structure information creating unit 110 are explained with reference to FIGS. 10 to 12. FIG. 10 is a flowchart of a procedure for the processing by the conversation structure information creating unit 110. The conversation structure information creating unit 110 sets category to "conversation" for respective voice conversation data and registers the voice conversation data in the voice conversation data table 300 together with recording dates, start times, end times, operator names, and group names that can be acquired simultaneously with recording the voice conversation data (step S301). The conversation structure information creating unit 110 gives IDs to the respective voice conversation data.

It is assumed that, in the voice conversation data treated here, voice of an operator utterance and voice of a customer utterance are recorded separately in two channels (stereo recording). Otherwise, speaker indexing processing for voice sections is performed according to a speaker identifying program.

Then, voice data of the respective channels (the respective speakers) are divided by a unit of utterance by silence sections. When voice conversation data with power equal to or lower than a predetermined threshold continues for a time equal to or longer than a predetermined threshold, the voice conversation data is set as a silence section and the other parts thereof are set as voice sections, that is, utterance sections (FIG. 2). Then, the conversation structure information creating unit 110 gives IDs to the respective utterance sections divided in this way and registers the speakers and corresponding times in the voice conversation data table 300 (step S302).

The conversation structure information creating unit 110 measures a pitch and a power for each of the utterance sections and calculates and extracts averages, maximum values, minimum values, and values at start time of the pitches and the powers. In addition, the conversation structure information creating unit 110 measures a pause length (FIG. 2) between a preceding utterance and the present utterance and registers a result of the measurement in the voice conversation data table 300 (step S303).

The conversation structure information creating unit 110 judges discourse tags for the respective utterance sections and registers the judged discourse tags in the voice conversation data table 300 (step S304). Note that details of processing for judging discourse tags are described later.

The conversation structure information creating unit 110 estimates breaks of phases from the judged discourse tags and prosodic characteristics of utterances and registers the breaks in the voice conversation data table 300 (step S305). Note that details of processing for estimating breaks of phases are also described later.

The conversation structure information creating unit 110 creates the conversation structure information 200 based on the information on the discourse tags, the breaks of phases, and the like (step S306). Then, the conversation structure information creating unit 110 stores the created conversation structure information 200 in the sound data holding unit 120 (step S307).

Figure 11:
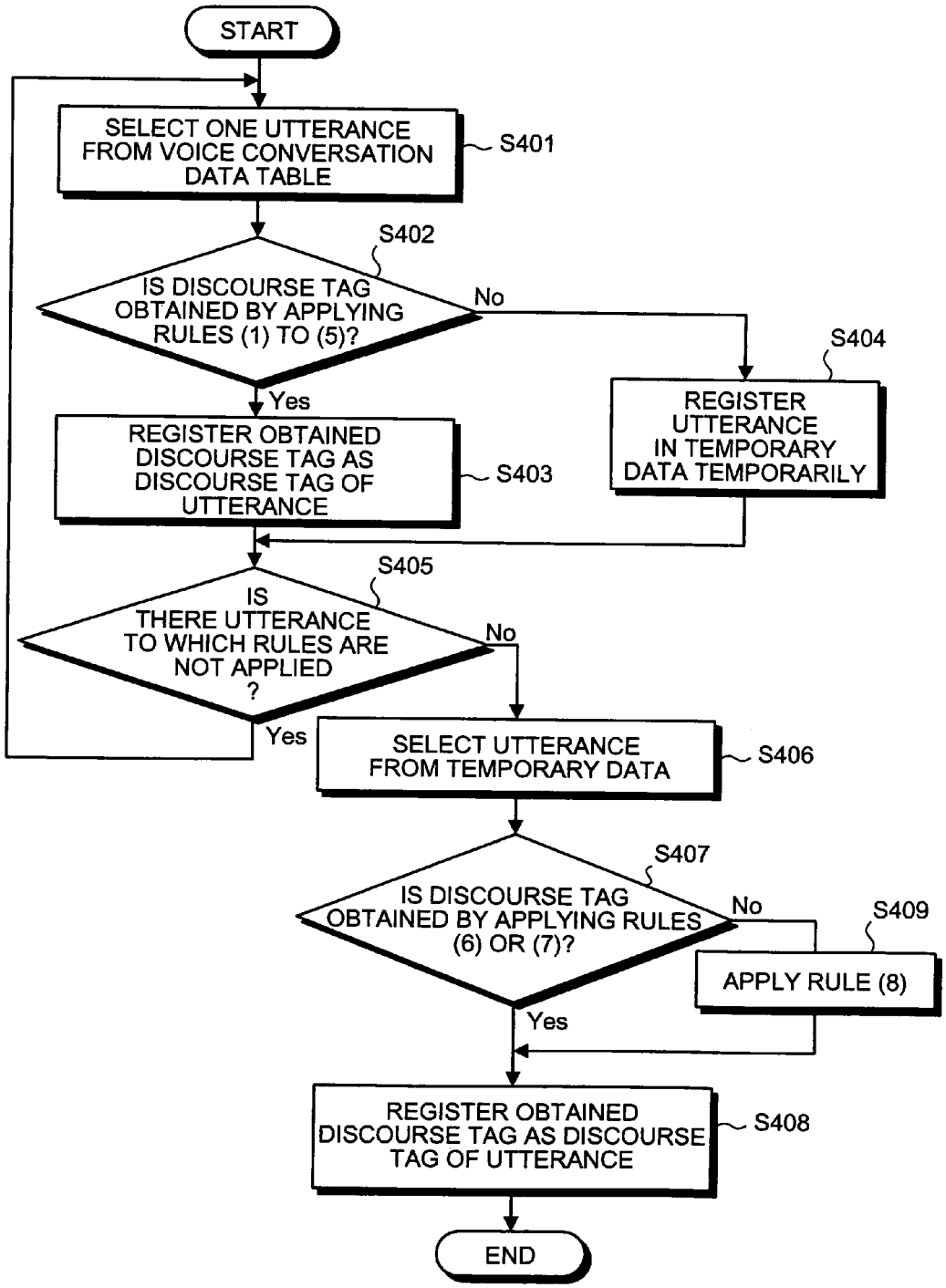
FIG. 11 is a flowchart of a procedure for discourse tag judgment processing.

FIG. 11 is a flowchart of the discourse tag judgment processing. First, the conversation structure information creating unit 110 selects one utterance section from the voice conversation data table 300 (step S401) and judges discourse tags according to the following rules (1) to (5):

(1) If the result of voice recognition, which is performed for each utterance section, shows that the utterance section begins with "Do you", "Are you", "Did you", "Wh-clause do you" and so on, the discourse tag "question" is assigned;

(2) If the utterance section has a rising pitch of 200 milliseconds at an end, the discourse tag "question" is assigned;

(3) If the utterance section has a length of 20 milliseconds or less, discourse tag "acknowledgement" is assigned;

(4) If the result of voice recognition shows that the utterance section includes "hello", "thank you", or "excuse me", the discourse tag "greeting" is assigned; and (5) If the utterance section ends with a declarative tone, discourse tag "explanation" is assigned.

Then, the conversation structure information creating unit 110 judges whether a discourse tag is obtained by applying the rules (1) to (5) (step S402). If a discourse tag is obtained, the conversation structure information creating unit 110 registers the discourse tag in the voice conversation data table 300 (step S403). If a discourse tag is not obtained, the conversation structure information creating unit 110 temporarily registers the utterance data in temporary data (step S404).

The conversation structure information creating unit 110 judges whether there is an utterance section, to which the rules (1) to (5) are not applied, in the voice conversation data table 300 (step S405). If there is such an utterance section, the conversation structure information creating unit 110 returns to step S401 and selects the next utterance section. If there is no such an utterance section, the conversation structure information creating unit 110 selects utterance section from the temporary data (step S406) and applies the following rules (6) and (7) to obtain the discourse tag:

(6) If the utterance section is following "question" of the other person, and followed by another utterance section including the same word as the utterance section, the discourse tag of the former utterance section is "answer" and the discourse tag of the latter utterance section is "confirmation"; (examples: A: "May I have your address?" "Question"

B: "Kawasaki" "Answer"

C: "Kawasaki, all right" "Confirmation"

(7) If the utterance section includes "Yes" or "I see" after "confirmation", the discourse tag is "confirmation reply"

(8) If the utterance section does not fall under the above rules, the discourse tag is "others".

Then, the conversation structure information creating unit 110 judges whether a discourse tag is obtained by applying the rules (6) and (7) (step S407). If a discourse tag is obtained, the conversation structure information creating unit 110 registers the discourse tag in the voice conversation data table 300 (step S408). If a discourse tag is not obtained, the conversation structure information creating unit 110 applies the rule (8) (step S409) and registers the discourse tag "others" in the voice conversation data table 300 (step S408).

Figure 12:
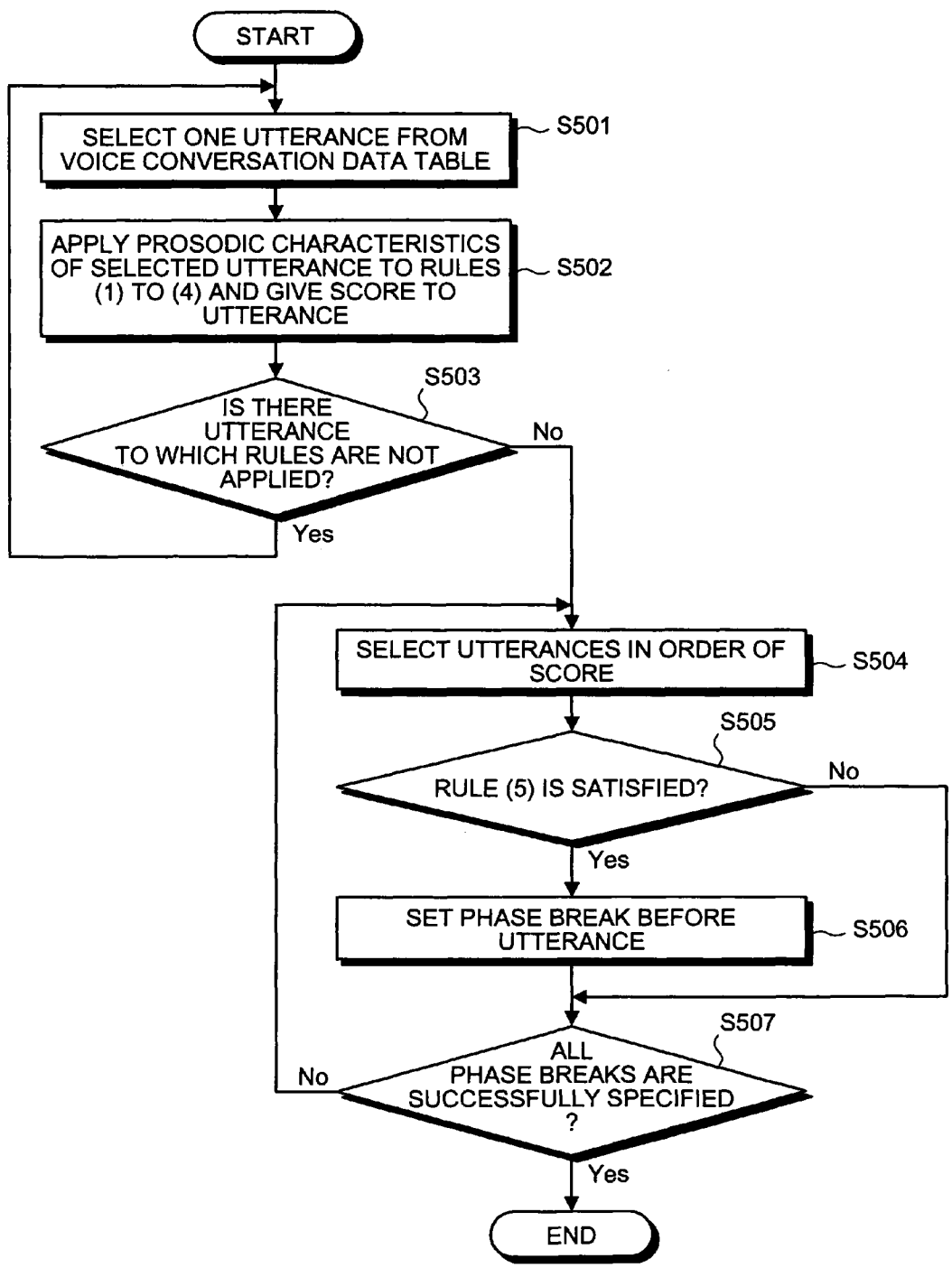
FIG. 12 is a flowchart of a procedure for a phase break estimation processing.

FIG. 12 is a flowchart of the phase break estimation processing. First, the conversation structure information creating unit 110 selects one discourse from the voice conversation data table 300 (step S501). The conversation structure information creating unit 110 applies the following rules (1) to (4), which represent prosodic characteristics of breaks of phases, to the selected discourse and gives score 1 to the discourse when any one of the rules (1) to (4) can be applied (step S502):

(1) A pause length is long, (2) A pitch of the discourse is longer than the preceding discourse, (3) A power of the discourse is larger than the preceding discourse, (4) A word like "well", "now", "by the way", or "yes" is often used, and (5) A discourse tag at the time of start is "question", "explanation", or "greeting".

Then, the conversation structure information creating unit 110 judges whether there is a discourse, to which the rules (1) to (4) are not applied, in the voice conversation data table 300 (step S503). If there is such a discourse, the conversation structure information creating unit 110 returns to step S501 and selects the next discourse. If there is no such a discourse, the conversation structure information creating unit 110 selects discourses in an order of scores (step S504). The conversation structure information creating unit 110 judges whether the rule (5) is satisfied (step S505).

The rule (5) is based on the fact that a top discourse tag of a phase "start greeting" tends to be "greeting" and a top discourse tag of a phase "customer information collection" tends to be "question".

The conversation structure information creating unit 110 sets a break of a phase before the discourse that satisfies the rule (5) (step S506) and judges whether all phase breaks are successfully specified (step S507). If all the phase breaks are not successfully specified, the conversation structure information creating unit 110 returns to step S504 and selects the next discourse. If all the phase breaks are successfully specified, the conversation structure information creating unit 110 gives IDs to the specified phases and registers the IDs in the voice conversation data table 300 together with information on corresponding sections. In addition, since sections are decided, the conversation structure information creating unit 110 calculates an average of pitches of the sections and the like and registers the average and the like in the voice conversation data table 300.

As described above, in this embodiment, the replay section receiving unit 130 receives designation of a replay section from the user, the replay section determining unit 160 determines a replay section using the replay section designated by the user and the conversation structure information 200, and the reproducing unit 180 reproduces voice in the replay section determined by the replay section determining unit 160. Thus, it is possible to reproduce voice in an appropriate section in view of the replay section designated by the user.

The conversation structure display unit 140 displays the conversation structure information 200 of a conversation including the replay section designated by the user, the input receiving unit 150 receives a node selected by the user using a display screen for the conversation structure information 200, and the replay section determining unit 160 determines a replay section based on the node selected by the user. Thus, the user can designate a replay section easily and listen to voice in an appropriate section in view of the replay section.

The input receiving unit 150 receives an extension level of the replay section designated by the user using the replay section adjusting slider and the replay section determining unit 160 determines an extension section using the extension level and the conversation structure information 200. Thus, the user can listen to voice extended in an appropriate section. The replay section can be automatically extended based on a rule pertaining to the discourse tag or a learning result of user's operation to extend the replay section, as well as the tree structure shown in FIG. 9.

When there is a discontinuous part in the replay section, the discontinuous part processing unit 170 inserts silence of a length proportional to time of the discontinuous part in the utterance. Thus, the user can recognize that there is an unreproduced utterance part easily.

Note that, in the explanation of this embodiment, conversation structure information is represented by a tree structure. However, the invention is not limited to this and can also be applied when the conversation structure information is represented by a network structure.

In addition, in the explanation of this embodiment, a part of a call between an operator in a call center and a customer is reproduced. The invention is not limited to this and can also be applied when a part of conference recording by plural attendants is reproduced.

Further, in this embodiment, the sound reproducing apparatus 100 is explained. It is possible to obtain a sound reproducing program having the same function as the sound reproducing apparatus 100 by realizing the constitution of the sound reproducing apparatus 100 with software. Thus, a computer executing this sound reproducing program is explained.

Figure 13:
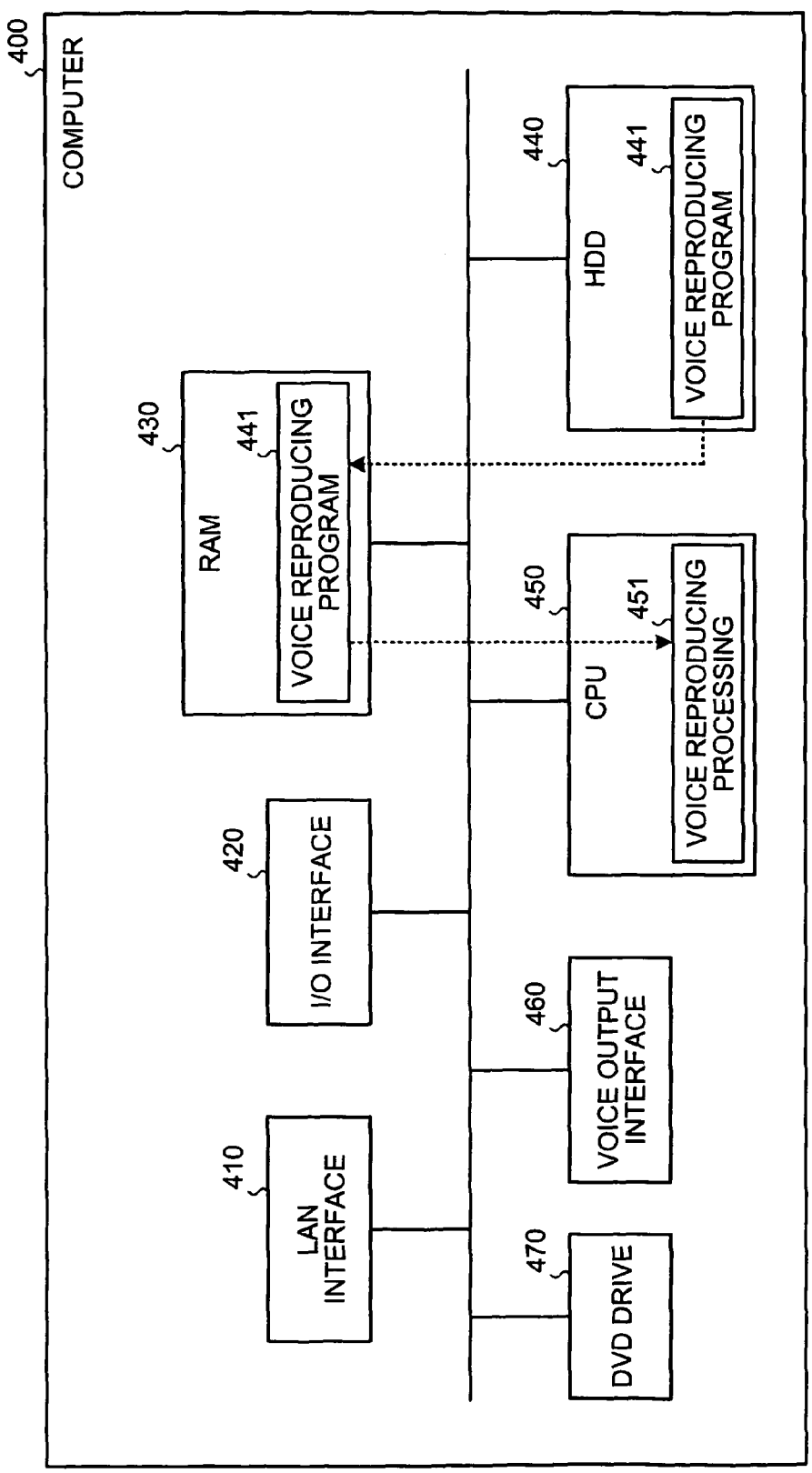
FIG. 13 is a functional block diagram of a structure of a computer that functions as the sound reproducing apparatus.

FIG. 13 is a functional block diagram of a structure of the computer that executes the sound reproducing program according to this embodiment. As shown in the figure, a computer 400 includes a LAN interface 410, an I/O interface 420, a RAM 430, an HDD 440, a CPU 450, a voice output interface 460, and a DVD drive 470.

The LAN interface 410 is an interface for connecting the computer 400 to a LAN. The I/O interface 420 is an interface for connecting input devices like a mouse and a keyboard and a display device.

The RAM 430 is a memory that stores a sound reproducing program 441 and a result in the middle of execution of the program. The HDD 440 is a disk device that stores the sound reproducing program 441 and the like.

The CPU 450 is a central processing unit that reads out the program from the RAM 430 and executes the program. The voice output interface 460 is an interface for connecting the computer 400 to a speaker that outputs voice. The DVD drive 470 is a device that writes data in and reads out data from a DVD.

The sound reproducing program 441, which is executed in the computer 400, is stored in the DVD, read out from the DVD by the DVD drive 470, and installed in the computer 400.

Alternatively, the sound reproducing program 441 is stored in databases of other computer systems connected to the computer 400 via the LAN interface 410, read out from these databases, and installed in the computer 400.

The installed sound reproducing program 441 is stored in the HDD 440, read out to the RAM 430, and executed as a sound reproducing process 451 by the CPU 450.

According to the present invention, since voice in a section meaningful in view of a conversation structure is reproduced, it is possible to reproduce voice in an appropriate section.

Moreover, since voice in a minimum section meaningful in view of a conversation structure is reproduced, it is possible to reproduce voice in an appropriate section.

Furthermore, since a replay section is extended appropriately, it is possible to reproduce voice efficiently.

Moreover, since a user can designate an appropriate replay section easily, it is possible to reproduce voice efficiently.

Furthermore, since a user can recognize discontinuous utterance parts, it is possible to reproduce utterance parts, which are not reproduced, as required.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium that stores a computer program for reproducing a specific part of recorded sound, wherein the computer program causes a computer to execute operations comprising:
creating a structure of the recorded sound by analyzing the recorded sound, the structure including a tree structure with a plurality of nodes, wherein the nodes include a first node, a second node and a third node, the first node being determined as an utterance of one person based on power of sound included in the recorded sound wherein an utterance tag is determined for the first node based on a result of voice recognition, the second node including a pair of first nodes wherein pairing of first nodes is determined based on a predetermined pairing of utterance tags determined for first nodes, the third node including at least a first node or a second node and being determined based on a pause length between first nodes, a pitch change between first nodes, a power pitch change between first nodes and a result of voice recognition;
displaying the structure of the recorded sound on a display;
receiving a request for reproducing a first part of the recorded sound from a user, the user specifying the first part in the structure of the recorded sound displayed, the first part including the first node, the second node or the third node;
determining a second part of the recorded sound, based on the request and the structure of the recorded sound, by including, in the second part, any one of a brother node of a node corresponding to the first part and a parent node of the node corresponding to the first part; and
reproducing the second part.

2. The non-transitory computer-readable recording medium according to claim 1, wherein the determining includes determining a minimum unit as the second part, the minimum unit including the first part.

3. The non-transitory computer-readable recording medium according to claim 1, wherein the reproducing includes reproducing a predetermined sound when reproducing a part, which corresponds to a node not specified by the user, of the second part.

4. A sound reproducing apparatus for reproducing a specific part of recorded sound, comprising:
a creating unit that creates a structure of the recorded sound by analyzing the recorded sound, the structure including a tree structure with a plurality of nodes, wherein the nodes include a first node, a second node and a third node, the first node being determined as an utterance of one person based on power of sound included in the recorded sound wherein an utterance tag is determined for the first node based on a result of voice recognition, the second node including a pair of first nodes wherein pairing of first nodes is determined based on a predetermined pairing of utterance tags determined for first nodes, the third node including at least a first node or a second node and being determined based on a pause length between first nodes, a pitch change between first nodes, a power pitch change between first nodes and a result of voice recognition;

a display unit that displays the structure of the recorded sound on a display;

a receiving unit that receives a request for reproducing a first part of the recorded sound from a user, the user specifying the first part in the structure of the recorded sound displayed, the first part including the first node, the second node or the third node;

a determining unit that determines a second part of the recorded sound, based on the request and the structure of the recorded sound, by including, in the second part, any one of a brother node of a node corresponding to the first part and a parent node of the node corresponding to the first part; and a reproducing unit that reproduces the second part wherein the creating unit, the display unit, the receiving unit, the determining unit, and the reproducing unit are implemented by a computer.

5. The sound reproducing apparatus according to claim 4, wherein the determining unit determines a minimum unit as the second part, the minimum unit including the first part.

6. The sound reproducing apparatus according to claim 5, wherein the recorded sound is a recorded conversation between two persons, and the unit is a pair of utterances that includes an utterance of one person of the two, which is the first part, and an utterance of the other person of the two.

7. The sound reproducing apparatus according to claim 4, wherein the reproducing unit reproduces a predetermined sound when reproducing a part, which corresponds to a node not specified by the user, of the second part.

8. The sound reproducing apparatus according to claim 7, wherein duration time of the predetermined sound is shorter than that of the node not specified.

9. The sound reproducing apparatus according to claim 8, wherein the predetermined sound is sound effect corresponding to a type of the node.

10. A method for reproducing a specific part of recorded sound, comprising:

creating a structure of the recorded sound by analyzing the recorded sound, the structure including a tree structure with a plurality of nodes, wherein the nodes include a first node, a second node and a third node, the first node being determined as an utterance of one person based on power of sound included in the recorded sound wherein an utterance tag is determined for the first node based on a result of voice recognition, the second node including a pair of first nodes wherein pairing of first nodes is determined based on a predetermined pairing of utterance tags determined for first nodes, the third node including at least a first node or a second node and being determined based on a pause length between first nodes, a pitch change between first nodes, a power pitch change between first nodes and a result of voice recognition;

displaying the structure of the recorded sound on a display;

receiving a request for reproducing a first part of the recorded sound from a user, the user specifying the first part in the structure of the recorded sound displayed, the first part including the first node, the second node or the third node;

determining a second part of the recorded sound, based on the request and the structure of the recorded sound, by including, in the second part, any one of a brother node of a node corresponding to the first part and a parent node of the node corresponding to the first part; and reproducing the second part.

11. The method according to claim 10, wherein the determining includes determining a minimum unit as the second part, the minimum unit including the first part.

* * * * *